3,332,991
SOLUBLE SALTS OF HETEROCYCLIC IODINE-CONTAINING BACTERICIDES

William N. Cannon, Greenwood, Ind., assignor to Eli Lilly and Company, Indianapolis, Ind., a corporation of Indiana
No Drawing. Filed Mar. 22, 1965, Ser. No. 441,890
3 Claims. (Cl. 260—535)

This application is a continuation-in-part of my co-pending application, Ser. No. 123,449, filed July 12, 1961, now Patent No. 3,207,660.

This invention relates to certain novel and highly useful water-soluble antiseptic salts, and to methods for their preparation.

The novel water-soluble salts provided by this invention can be represented by the following formula:

Formula I

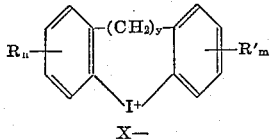

wherein R and R' are members of the group consisting of halogen, lower alkyl, perfluorinated lower alkyl, lower alkoxy, and nitro; $y$, $n$ and $m$ are numbers from 0 to 3; and X is an anion selected from the class consisting of phosphate anions, and α-hydroxyaliphatic carboxylate anions represented by the formula

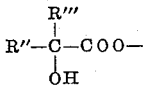

where R" is a member of the group consisting of hydrogen and lower alkyl; and R''' is a member of the group consisting of lower alkyl, lower alkenyl, carboxy-substituted lower alkyl and α-hydroxycarboxy-substituted lower alkyl.

In the above formula when $y$ is 0, the compounds are denominated dibenziodolium compounds; when $y$ is 1, dibenziodininium compounds; when $y$ is 2, dihydrodibenziodopinium compounds; and when $y$ is 3, dihydrodibenziodocinium compounds.

The term "phosphate anion" as used in the above formula includes any of the known phosphate radicals which can be derived by hydration of phosphorus pentoxide and includes the anions of orthophosphoric acid ($H_3PO_4$), metaphosphoric acid ($HPO_3$), and pyrophosphoric acid ($H_4P_2O_7$), including the mono- and dihydrogen ions of these acids such as monohydrogen orthophosphate ($HPO_4^=$) and dihydrogen orthophosphate ($H_2PO_4^=$). Exemplary of the acids from which the α-hydroxyaliphatic carboxylate anions are derived are lactic, citric, glycollic, gluconic, glucoheptonic, saccharic, malic, tartaric and like acids. In the definitions of R, R'. R" and R''' above, "lower alkyl" includes alkyl groups having from 1–5 carbon atoms such as methyl, ethyl, n-propyl, isopropyl, n-butyl, isobutyl, sec.-butyl, n-amyl, isoamyl, sec.-amyl, t-amyl and the like. In defining R" and R''', the term "lower alkenyl" is to include those mono unsaturated aliphatic groups having from 2–5 carbon atoms such as vinyl, allyl, methallyl, crotyl and the like. When R and R' in Formula I are halogen, they can be, illustratively, chloro, bromo, fluoro or iodo. When R and R' are lower alkoxy radicals, they can be formed by linking any of the above lower alkyls to the phenyl ring through an oxygen atom to yield lower alkoxy radicals such as methoxy, ethoxy, n-propoxy, sec.-butoxy and the like. Perfluorinated lower alkyl groups which R and R' can represent include trifluoromethyl, pentafluorethyl, heptafluoropropyl, undecafluoropentyl and the like.

Typical compounds represented by the above formula include

Dibenziodolium lactate
2,4-diethoxydibenziodolium citrate
3,7-dinitrodibenziodolium tartrate
3-n-propoxydibenziodolium malate
2-fluoro-10H-dibenz[b,e]iodininium pyrophosphate
2-(perfluorethyl)dibenziodolium gluconate
2-iodo-11,12-dihydro-10H-dibenz[b,g]iodocinium lactate
Bis(3-chlorodibenziodolium) monohydrogen phosphate
3-chloro-10,11-dihydrodibenz[b,f]iodopinium dihydrogen phosphate The salts represented by Formula I are useful in preserving various medicaments, paints, powders, varnishes, cutting oils, ointments, etc., from bacterial and fungal attack, and can also be employed as the active ingredient in oral, parenteral, and topical antimicrobial solutions and ointments. The salts of this invention, having surprisingly high water solubility, are of particular value in circumstances where an aqueous medium is involved, as for example, as bactericidal agents in laundry soaps which impart bactericidal action to the wash water, or as preservatives in aqueous shampoos, cutting oils, water-base paints and the like.

The water solubility of two representative salts provided by this invention is compared below in Table I to the solubility of other common salts of the cations set forth in Formula I above.

TABLE I

| Salt: | Solubility in mg./ml. of water at 25° C. |
|---|---|
| Dibenziodolium lactate | 403.2 |
| Dibenziodolium dihydrogen phosphate | 4.5 |
| Dibenziodolium sulfate | 1.5 |
| Dibenziodolium 2,4,5-trichlorophenate | 0.05 |
| Bis(2,4-dichlorodibenziodolium) sulfate | 0.11 |

The salts provided by this invention are formed from a dibenziodolium, a dibenziodininium, a dihydrodibenziodopinium, or a dihydrodibenziodocinum cation (depending upon the value of $y$ in Formula I) and an anion which imparts a relatively high degree of water solubility to the final salt. The nature of these anions does not, however, affect the microbiocidal activity of the cations to any great extent; that is to say, the bactericidal effectiveness of a salt will depend upon the concentration of the heterocyclic iodine-containing cation and not on the anion with which it is associated.

The synthesis of the salts represented by Formula I above can be carried out by methods well known to the art. For example, a bis(dibenziodolium) sulfate can be reacted with barium lactate to yield the lactate salt and barium sulfate as an insoluble by-product. Alternatively, an aqueous solution of a bis(dibenziodolium) sulfate can be reacted with barium hydroxide to yield an insoluble precipitate of barium sulfate plus a solution of the dibenziodolium hydroxide. Neutralization of the hydroxide with a phosphate or with an α-hydroxyaliphatic acid yields a dibenziodolium salt in which the anion of the acid becomes the anion of the salt. Additionally, an anion exchange resin can be employed to change the anion associated with a heterocyclic iodine salt, according to methods well known in the art.

The preparation of common salts, such as the sulfate chloride, nitrate, etc., of a dibenziodolium, dibenziodininium, dihydrodibenziodopinium or dihydrodbenziodocinium cation, is set forth in my co-pending application, Ser. No. 123,449.

The following examples more fully illustrate the preparation of the water-soluble salts of this invention.

*Example 1.—Dibenziodolium lactate*

10.2 grams of bis(dibenziodolium) sulfate were dissolved in 1,000 ml. of hot water. 6.63 grams of barium hydroxide octahydrate were dissolved in a minimum volume of water and this solution was added to the solution of the iodolium compound. An immediate precipitate of barium sulfate came down. The reaction mixture was cooled with stirring to insure complete precipitation of barium sulfate, which was then separated by filtration. The pH of the solution was adjusted from about pH 12 to about pH 3 by slow addition of an 85 percent aqueous lactic acid solution. Evaporation of the aqueous solvent in vacuo yielded dibenziodolium lactate as a residue. Recrystallization of the residue from an ethanol-ether solvent mixture yielded dibenziodolium lactate melting at about 156–159° C.

Dibenziodolium glycolate was prepared from glycolic acid by the above procedure and melted at about 150–152° C.

Bis(dibenziodolium) sulfate was converted to dibenziodolium citrate by the above procedure using citric acid in place of lactic acid. The compound melted with decomposition at about 176–178° C.

*Analysis.*—Calc.: I, 26.99. Found: I, 26.96.

Bis(dibenziodolium) sulfate was converted to dibenziodolium dihydrogen phosphate by the above procedure using phosphoric acid in place of lactic acid and melted at about 272–274° C.

*Analysis.*—Calc.: I, 35.75. Found: I, 35.55.

*Example 2.—Alternate preparation of dibenziodolium lactate*

A solution containing 0.1 mole of barium lactate was prepared from lactic acid and barium hydroxide. 9.9 grams of dibenziodolium bisulfate were added to the barium lactate solution with stirring. The stirring was continued overnight. The precipitated barium sulfate was separated by filtration. The filtrate containing dibenziodolium lactate was evaporated to dryness, leaving the desired compound as a white crystalline residue. The compound was purified by recrystallization from an ethanol-ether solvent mixture.

2,4-dichlorodibenziodolium lactate was prepared by the above procedure using bis(2,4-dichlorodibenziodolium) sulfate in place of dibenziodolium bisulfate as the starting material.

I claim:

1. A water-soluble salt of the formula:

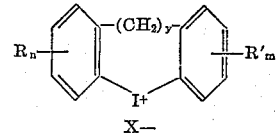

wherein R and R' are members of the group consisting of halogen, lower alkyl, perfluorinated lower alkyl, lower alkoxy, and nitro; $y$, $n$ and $m$ are numbers from 0 to 3; and X is lactate.

2. Dibenziodolium lactate.

3. 2,4-dichlorodibenziodolium lactate.

References Cited

Collett et al.: "J. Am. Chem. Soc." vol. 78, pp. 3819–3820 (1956).

Hwang: "Chemical Abstracts," vol. 52, Col. 16356(b) (1958).

LEON ZITVER, *Primary Examiner.*

DANIEL D. HORWITZ, *Examiner.*

M. JACOB, *Assistant Examiner.*